US012327105B2

(12) United States Patent
Inoue

(10) Patent No.: US 12,327,105 B2
(45) Date of Patent: Jun. 10, 2025

(54) SOFTWARE UPDATE CONTROL APPARATUS, VEHICLE, COMPUTER-READABLE STORAGE MEDIUM, AND SOFTWARE UPDATE CONTROL METHOD

(71) Applicant: HONDA MOTOR CO., LTD., Tokyo (JP)

(72) Inventor: Genta Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 187 days.

(21) Appl. No.: 18/157,089

(22) Filed: Jan. 20, 2023

(65) Prior Publication Data

US 2023/0297363 A1   Sep. 21, 2023

(30) Foreign Application Priority Data

Mar. 15, 2022  (JP) .................................. 2022-040833

(51) Int. Cl.
*B60R 1/00* (2022.01)
*B60W 50/06* (2006.01)
(Continued)

(52) U.S. Cl.
CPC ............... *G06F 8/65* (2013.01); *B60W 50/06* (2013.01); *B60W 50/14* (2013.01); *B60W 2050/146* (2013.01); *B60W 2540/229* (2020.02)

(58) Field of Classification Search
CPC ......... G06F 8/65; B60W 50/06; B60W 50/14; B60W 2050/146; B60W 2050/229; B60W 2050/043; B60W 2556/10; G06V 20/593
See application file for complete search history.

(56) References Cited

U.S. PATENT DOCUMENTS 9,886,841 B1 * 2/2018 Nave ....................... G06Q 40/08
10,106,156 B1 * 10/2018 Nave ................. B60W 50/0098
(Continued)

FOREIGN PATENT DOCUMENTS

CN   114667501 A  *  6/2022  ............... G06F 8/65
JP   2012013443 A      1/2012

OTHER PUBLICATIONS

Ttatsu et al. filed date 2020, PDF English version, Vehicle Update Device and Update Treated, total p. 19. (Year: 2020).*

*Primary Examiner* — S. Sough
*Assistant Examiner* — Mohammad H Kabir

(57) ABSTRACT

A software update control apparatus which is mounted on a vehicle and is configured to control a software update of in-vehicle equipment performed via a communication unit, including: an acquisition unit configured to acquire information representing a recognition result of a passenger in the vehicle, who has been recognized by capturing an image of the passenger in the vehicle; and a notification control unit configured to control a notification of update information related to the software update, in which the notification control unit is configured to determine, based on the information representing the recognition result of the passenger, whether the passenger has received the notification of the update information in a past, and change a mode of the notification of the update information according to a determination result on whether the passenger has received the notification of the update information in the past.

15 Claims, 10 Drawing Sheets

(51) Int. Cl.
 *B60W 50/14* (2020.01)
 *G06F 3/0488* (2022.01)
 *G06F 8/65* (2018.01)
 *G06K 9/00* (2022.01)
 *H04N 5/232* (2006.01)

(56) References Cited

U.S. PATENT DOCUMENTS

2017/0108348 A1* 4/2017 Hansen ................. H04W 4/024
2017/0313248 A1* 11/2017 Kothari ................. B60K 35/10
2021/0162927 A1* 6/2021 Takii ........................ B60Q 1/50
2021/0406570 A1* 12/2021 Bielby ................. G06F 18/254
2022/0066768 A1* 3/2022 Takatsuna ............. B60W 50/06

\* cited by examiner

| PERSON ID | NOTIFICATION TYPE ID | NUMBER OF TIMES OF NOTIFICATION |
|---|---|---|
| U101 | N400 | 1 |
| U102 | N400 | 5 |
| ⋮ | ⋮ | ⋮ |

FIG.7

SOFTWARE UPDATE CONTROL APPARATUS, VEHICLE, COMPUTER-READABLE STORAGE MEDIUM, AND SOFTWARE UPDATE CONTROL METHOD

The contents of the following Japanese patent application(s) are incorporated herein by reference:
NO. 2022-040833 filed on Mar. 15, 2022.

BACKGROUND

1. Technical Field

The present invention relates to a software update control apparatus, a vehicle, a computer-readable storage medium, and a software update control method.

2. Related Art

In recent years, efforts have been intensified to provide access to a sustainable transportation system with consideration given to even vulnerable people among other traffic participants. To realize this, research and development has been focused on to further improve traffic safety and convenience through research and development regarding a preventive safety technique. Patent Document 1 describes a technique of setting an ECU reprogramming guide method with respect to a user.

PRIOR ART DOCUMENT

Patent Document 1: Japanese Patent Application Publication No. 2012-13443

BRIEF DESCRIPTION OF THE DRAWINGS

FIG. 7 shows, in a table format, a data structure of history information used by a notification control unit 220 to change a display time of update information.

DESCRIPTION OF EXEMPLARY EMBODIMENTS

Hereinafter, embodiments of the present invention will be described. The embodiments do not limit the invention according to the claims. In addition, not all of the combinations of features described in the embodiments are essential for a solving means of the invention.

Figure 1:
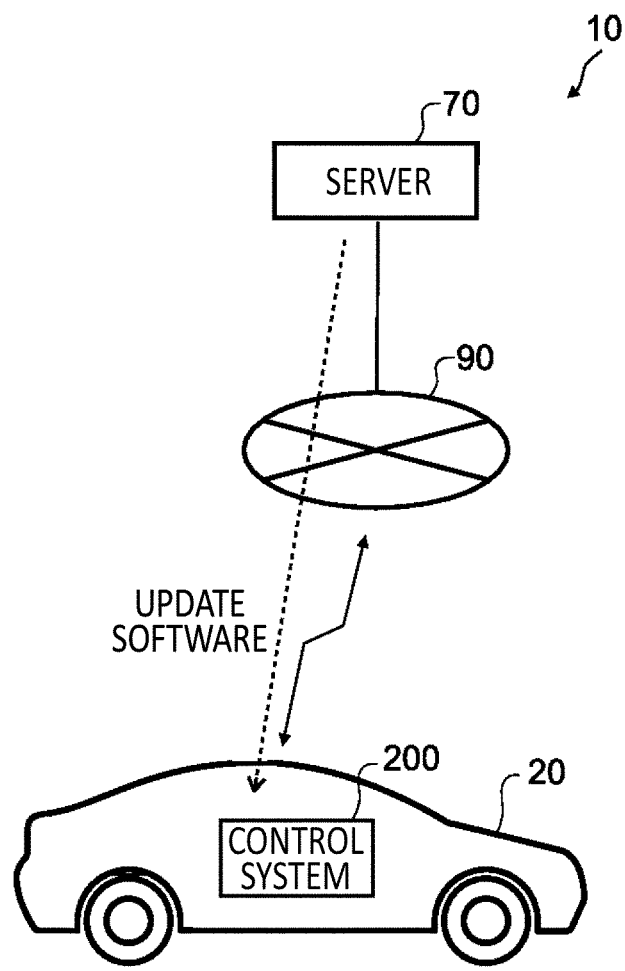
FIG. 1 schematically shows an update system 10 according to one embodiment.

FIG. 1 schematically shows an update system 10 according to one embodiment. The update system 10 includes a vehicle 20 and a server 70. The vehicle 20 includes a control system 200. The control system 200 is responsible for control of the vehicle 20 and communication with the server 70 via a communication network 90. The communication network 90 includes an IP network such as the Internet, a P2P network, a dedicated line including a VPN, a virtual network, a mobile communication network, and the like.

In the vehicle 20, the control system 200 includes a plurality of ECUs (Electronic Control Units) which perform control of the vehicle 20. The server 70 performs control related to reprogramming of the ECUs provided in the control system 200. For example, the server 70 transmits update software to the control system 200 via the communication network 90, and the control system 200 receives the update software transmitted via the communication network 90, by using wireless communication. The control system 200 performs reprogramming of an ECU by rewriting software for controlling the ECU provided in the control system 200 by the update software. The reprogramming is performed for upgrading functions of the ECU provided in the control system 200, and the like. In this manner, the control system 200 reprograms the ECU by updating the software of the ECU by OTA (Over The Air). In the present embodiment, rewriting software of equipment such as the ECU by update software will be referred to as a "software update".

The control system 200 displays update information related to a software update to a passenger of the vehicle 20, thereby notifying the passenger of the vehicle 20 of the update information. The control system 200 recognizes a current passenger in the vehicle 20 by recognizing an image obtained by image-capturing the inside of the vehicle 20. Moreover, the control system 200 stores history information representing the number of times each passenger has been notified of the update information in the past.

When newly displaying update information, the control system 200 determines, based on the history information, whether the current passenger of the vehicle 20 has seen the update information in the past. When determining that the passenger in the vehicle 20 has seen the update information in the past, the control system 200 sets a display time of the update information to be shorter than that when determining that the passenger in the vehicle 20 has not seen the update information in the past. By merely having the update information displayed for a short time, the passenger who has seen the update information a number of times can easily understand what the update information is. According to the control system 200, the update information can be displayed only for a short time for a passenger who has seen the update information in the past. Therefore, the notification of update information can be optimized according to the experience of the passenger related to the software update.

Figure 2:
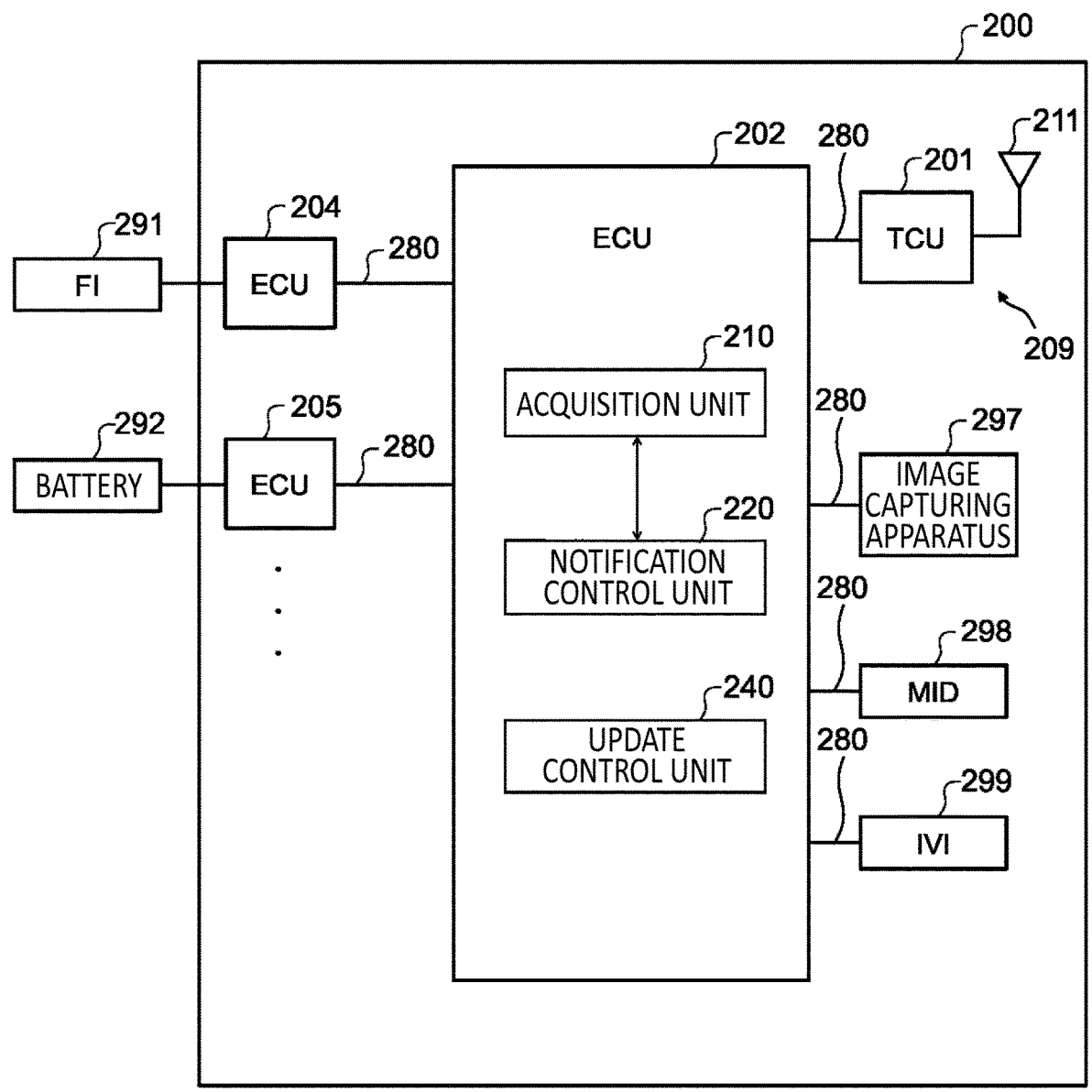
FIG. 2 schematically shows a system configuration of a control system 200.

FIG. 2 schematically shows a system configuration of the control system 200. The control system 200 includes a communication unit 209 including a TCU 201 and an antenna 211, an ECU 202, an ECU 204, an ECU 205, a MID 298, an IVI 299, and an image capturing apparatus 297. The ECU 202, the ECU 204, and the ECU 205 may be constituted by including a computer which includes a processor and a memory such as a volatile memory and a nonvolatile memory. In FIG. 2, an FI 291 and a battery 292 are equipment provided in the vehicle 20. The FI 291 and the battery 292 are an example of controlled equipment of the vehicle 20.

The ECU 202 is connected to the TCU 201, the ECU 204, the ECU 205, the MID 298, the IVI 299, and the image capturing apparatus 297 via an in-vehicle communication network 280. The ECU 202 performs communication with the TCU 201, the ECU 204, the ECU 205, the MID 298, the IVI 299, and the image capturing apparatus 297 via the in-vehicle communication network 280. The ECU 202 performs overall control of the TCU 201, the ECU 204, the ECU 205, the MID 298, the IVI 299, and the image capturing apparatus 297. The in-vehicle communication network 280 may be constituted by including, for example, a communication line compliant with CAN (Controller Area Network), a communication line compliant with Ethernet (registered trademark), and the like.

The TCU 201 is a telematics control unit. The TCU 201 is mainly responsible for mobile communication. The TCU 201 transmits and receives data to and from the server 70 based on control of the ECU 202. Based on the control of the ECU 202, the TCU 201 receives update software transmitted from the server 70, by using mobile communication.

The MID 298 is a multi-information display. The IVI 299 is, for example, in-vehicle infotainment information equipment (IVI). The MID 298 and the IVI 299 each have a function of displaying update information.

The ECU 204 and the ECU 205 are each an ECU as in-vehicle equipment which controls the vehicle 20. The ECU 204 and the ECU 205 control various pieces of equipment provided in the vehicle 20. For example, the ECU 204 controls the FI 291 which is a fuel injection apparatus. The ECU 205 controls the battery 292 which is a high-voltage battery.

Although the present embodiment exemplifies the system configuration in which the control system 200 includes the TCU 201, the ECU 202, the ECU 204, the ECU 205, the MID 298, and the IVI 299, the system configuration of the control system 200 is not limited to the example of the present embodiment. Further, in the present embodiment, the ECU 202 is an ECU which controls the software update. That is, the ECU 202 functions as a software update control apparatus which controls the software update. It is to be noted that a software update target may be the ECU 202 and the ECU 205. However, the TCU 201, the ECU 202, the MID 298, and the IVI 299 may also become the software update target.

A functional configuration of the ECU 202 related to the software update will be described. The ECU 202 controls the software update of the in-vehicle equipment performed via the communication unit 209. The ECU 202 includes an acquisition unit 210, a notification control unit 220, and an update control unit 240.

The acquisition unit 210 acquires information representing a recognition result of a passenger in a vehicle 20, who has been recognized by capturing an image of the passenger in the vehicle 20. The image capturing apparatus 297 recognizes the image obtained by image-capturing the inside of the vehicle 20, and transmits the information representing the recognition result of the passenger in the vehicle 20 to the ECU 202. The image capturing apparatus 297 may include, for example, a driver monitor camera (DMC).

The notification control unit 220 controls the notification of update information related to the software update. For example, the notification control unit 220 performs control for causing the IVI 299 to display update information. The notification control unit 220 may also perform control for causing the MID 298 to display update information. The update information may be notified via the in-vehicle equipment other than the IVI 299 and the MID 298.

The notification control unit 220 determines, based on the information representing the recognition result of the passenger in the vehicle 20, whether the passenger in the vehicle 20 has received a notification of update information in the past, and changes a mode of the notification of the update information according to a determination result on whether the passenger in the vehicle 20 has received the notification of the update information in the past. For example, when determining that the passenger in the vehicle 20 has received the notification of the update information in the past, the notification control unit 220 sets a display time of the notification of the update information to be shorter than that when determining that the passenger in the vehicle 20 has not received the notification of the update information in the past. Accordingly, the mode of the notification of the update information can be optimized according to whether the actual passenger in the vehicle 20 has received the notification of the update information in the past.

It is to be noted that the acquisition unit 210 may further acquire line of sight information representing a line of sight direction of the passenger in the vehicle 20, which has been identified by capturing an image of the passenger in the vehicle 20. The notification control unit 220 may determine, based on the line of sight information, whether the passenger in the vehicle 20 is looking at a display screen on which the notification of the update information is displayed, and prolong the display time of the notification of the update information when determining that the passenger in the vehicle 20 is looking at the display screen on which the notification of the update information is displayed. The acquisition unit 210 may acquire the line of sight information from the image capturing apparatus 297. The image capturing apparatus 297 identifies a facial orientation and eyeball positions of the passenger in the vehicle 20 by analyzing the image obtained by image-capturing the inside of the vehicle 20, identifies a line of sight direction of the passenger based on the identified facial orientation and eyeball positions of the passenger, and transmits line of sight information representing the identified line of sight direction to the ECU 202.

The acquisition unit 210 may further acquire operation information representing whether the display screen on which the notification of the update information is displayed has been operated. The notification control unit 220 may determine, based on the operation information, whether the display screen has been operated, and prolong the display time of the notification of the update information when determining that the display screen has been operated.

When a power supply of the vehicle 20 is turned off, the notification control unit 220 may determine whether the passenger in the vehicle 20 has received the notification of the update information in the past, based on the information representing the recognition result of the passenger in the vehicle 20, who has been recognized at a latest timing before the power supply of the vehicle 20 is turned off.

The notification control unit 220 may determine, while the vehicle 20 is traveling, whether the software update is to be performed. The acquisition unit 210 may start acquiring, when it is determined that the software update is to be performed, the information representing the recognition result of the passenger in the vehicle 20.

The update information is information that is notified when a predetermined condition for starting the software update is not satisfied in a case where the power supply of the vehicle 20 is turned off. The power supply of the vehicle 20 may be an IG (Ignition) power supply of the vehicle 20. The notification control unit 220 determines whether the predetermined condition is satisfied when the power supply of the vehicle 20 is turned off, determines whether the passenger in the vehicle 20 has received the notification of the update information in the past when the predetermined condition is not satisfied, and changes a mode of the notification of the update information according to a determination result on whether the passenger in the vehicle 20 has received the notification of the update information in the past.

The information representing the recognition result of the passenger in the vehicle 20, that is acquired by the acquisition unit 210, may include information representing whether the passenger in the vehicle 20 is a driver of the vehicle 20. For example, when the image capturing apparatus 297 includes a driver monitor camera, information that the driver monitor camera transmits to the ECU 202 may include information representing that the recognized passenger is a driver of the vehicle 20. The notification control unit 220 determines, based on the information representing the recognition result of the passenger in the vehicle 20, whether the driver of the vehicle 20 has received the notification of the update information in the past, and changes the mode of the notification of the update information according to a determination result on whether the driver of the vehicle 20 has received the notification of the update information in the past. Accordingly, the mode of the notification of the update information can be optimized according to whether the actual driver of the vehicle 20 has received the notification of the update information in the past.

The update control unit 240 is responsible for control of the software update. For example, the update control unit 240 controls processing of downloading update software from the server 70, processing of writing the downloaded update software in an update target ECU, processing of activating the ECU as the software update target, and the like.

Herein, the software update will be described. Herein, software update processing in a case where an internal memory for storing firmware of an update target ECU to be a software update target is a single bank memory (so-called one-sided ROM) will be described. In this case, since there is one program storage area for storing firmware of the update target ECU, when the update target ECU is operating according to a program stored in the program storage area, the update software cannot be written in the program storage area. Therefore, in a case where the program storage area of the update target ECU is a single bank memory, the software update is executed when the power supply system of the vehicle 20 is turned off. When performing the software update of the update target ECU, the ECU 202 transfers the update software to the update target ECU, and writes the transferred update software in the program storage area of the update target ECU, to activate the update software. The activation of the update software includes, for example, processing of setting a startup parameter of the ECU such that, when activating the ECU, the update software is loaded and control based on the update software is started, and the like.

Next, software update processing in a case where the internal memory of the update target ECU is a double bank memory (so-called two-sided ROM) will be described. In this case, since the update target ECU includes two program storage areas for storing firmware, when the update target ECU is operating according to a program stored in a first program storage area, the update software can be written in a second program storage area. For example, even while the vehicle 20 is traveling, the update software can be written in the second program storage area of the update target ECU. Therefore, the ECU 202 transfers the update software to the update target ECU and instructs the update target ECU to write the update software in the second program storage area. Upon completing the writing of the update software in the second program storage area of the update target ECU, the ECU 202 instructs the update target ECU to activate the update software written in the second program storage area. The activation of the update software includes, for example, processing of setting a startup parameter of the update target ECU such that, when activating the update target ECU, the update software stored in the second program storage area is loaded and control based on the update software is started. For example, the activation of the update software includes processing of invalidating the first program storage area as a program reading area as well as validating the second program storage area as the program reading area. In this manner, the "ECU software update" is a concept including writing the update software in the program storage area of the ECU. Moreover, the "ECU software update" is a concept including activating the update software written in the program storage area.

Figure 3:
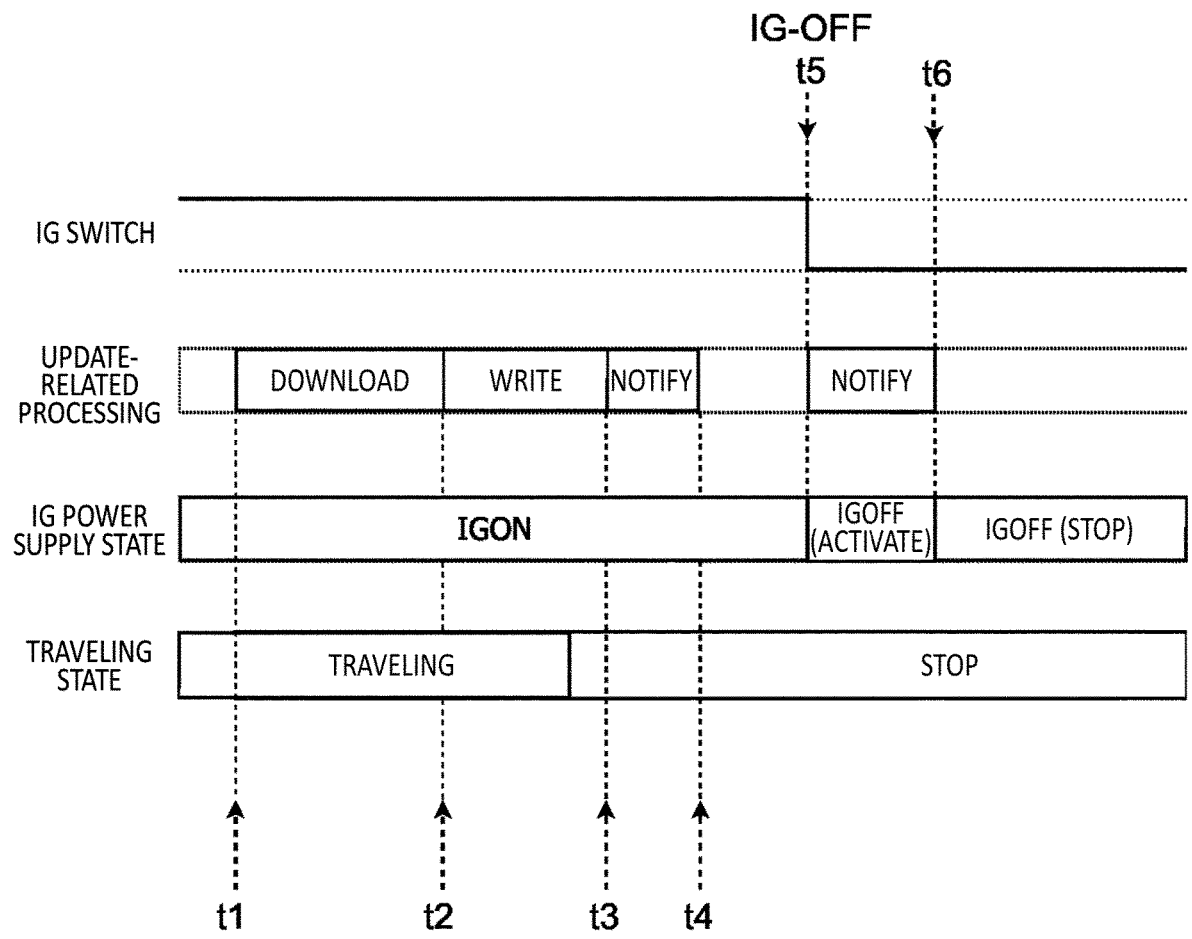
FIG. 3 schematically shows an example of a time chart related to software update processing.

FIG. 3 schematically shows an example of a time chart related to the software update processing. FIG. 3 shows an operation state of the IG power supply, an execution state of update-related processing, a power supply state, and a traveling state of the vehicle 20. It is to be noted that the equipment to be the software update target is assumed to be the ECU 205. Further, it is assumed that the ECU 205 includes a double bank memory as the internal memory.

Figure 4:
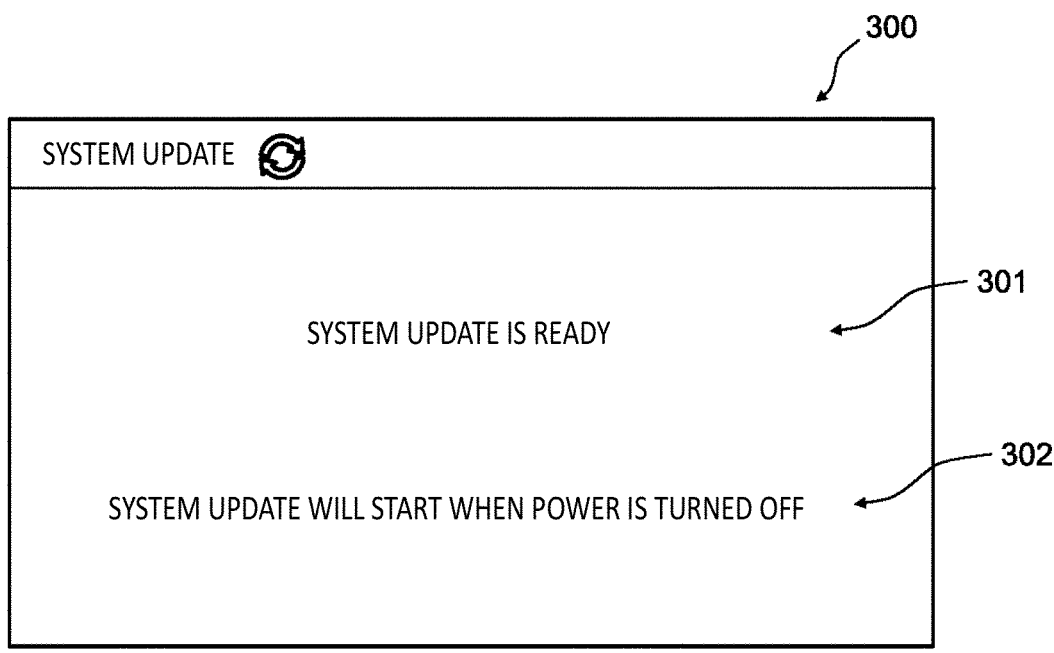
FIG. 4 shows an example of update information 300 that is caused to be displayed by an IVI 299.

It is assumed that the vehicle 20 is traveling at a start timing of the time chart shown in FIG. 3. At a time t1, when notified from the server 70 that an update program of the ECU 205 exists, the ECU 202 starts downloading the update software while the vehicle 20 is traveling. Upon completing the download at a time t2, the update control unit 240 starts writing the update program in the ECU 205 to be the software update target. Upon completing the writing of the update software in the ECU 205 at a time t3, the notification control unit 220 causes the IVI 299 to display a notification representing that the writing of the update software has been completed until a time t4. An example of this notification is shown in FIG. 4.

After that, when the passenger of the vehicle 20 performs an operation of turning off the IG power supply at a time t5, a power supply state of the IG power supply becomes a state where specific in-vehicle equipment is activated at a time the IG is off. At this time, the notification control unit 220 determines whether the vehicle 20 is in a state where the software update of the ECU 205 can be executed, and causes the IVI 299 to display update information corresponding to the determination result. The notification control unit 220 determines that the vehicle 20 is in a state where the software update of the ECU 205 can be executed when a predetermined condition for executing the software update of the ECU 205 is satisfied, and determines that the vehicle 20 is not in a state where the software update of the ECU 205 can be executed when the predetermined condition is not satisfied. The predetermined condition may include a condition that the vehicle 20 is stopped. The predetermined condition may include a condition that a charging state of a battery provided in the vehicle 20 is higher than a predetermined value requisite for performing the software update of the ECU 205. It is to be noted that the charging state of the battery may include either one of a charging state of a low-voltage battery or a charging state of a high-voltage battery which supplies electric power for traveling, that is provided in the vehicle 20.

Figure 5:
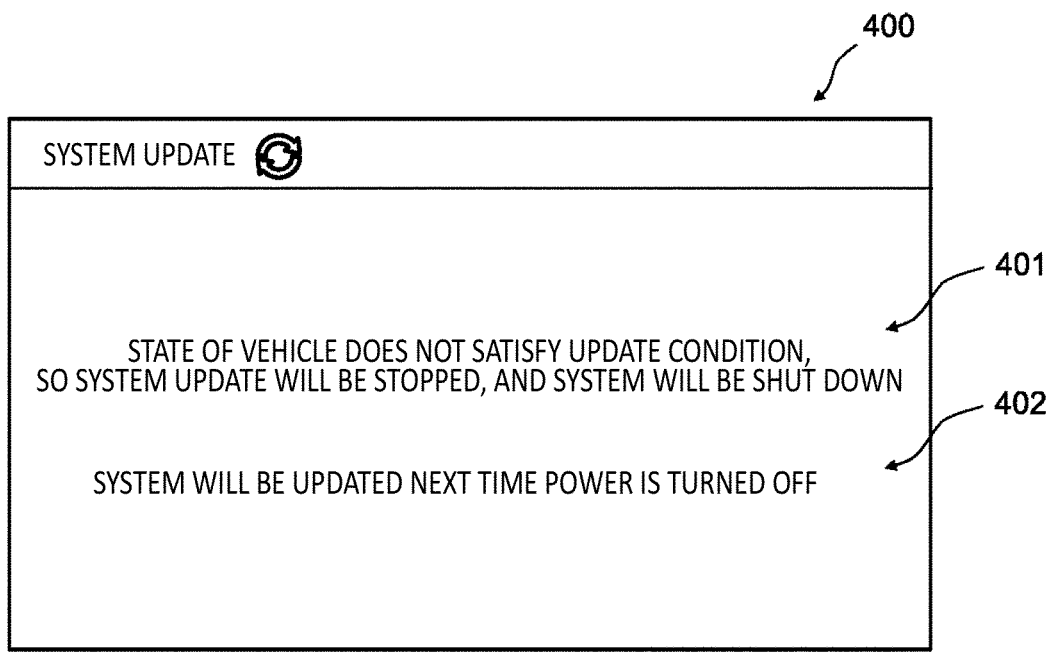
FIG. 5 shows an example of update information 400 that is caused to be displayed by the IVI 299.

In the example shown in FIG. 3, it is assumed that the vehicle 20 is not in a state where the software update of the ECU 205 can be executed. In this case, the notification control unit 220 causes the IVI 299 to display a notification representing that the software update is not to be performed from the time t5 to the time t6. An example of this notification is shown in FIG. 5. At the time t6, the IG power supply state is completely in a stopped state. That is, the power supply is completely shut down.

Herein, the notification control unit 220 determines whether the passenger of the vehicle 20 has seen the notification representing that the software update is not to be performed in the past. In a case where the passenger of the vehicle 20 has seen the notification representing that the software update is not to be performed in the past, the notification control unit 220 sets a time that the IVI 299 is caused to display the notification representing that the software update is not to be performed to be shorter than that in a case where the passenger of the vehicle 20 has not seen the notification representing that the software update is not to be performed in the past. That is, when the passenger of the vehicle 20 has seen the notification representing that the software update is not to be performed in the past, the notification control unit 220 shortens the period between the time t5 and the time t6.

FIG. 4 shows an example of update information 300 that is caused to be displayed by the IVI 299. The update information 300 is information that is notified when writing of update software is completed. The update information 300 is update information related to the "completion of writing of update software". When update software downloaded from the server 70 is written in the ECU 205, the notification control unit 220 causes the IVI 299 to display the update information 300. The update information 300 includes information 301 representing that a preparation of the software update is completed and information 302 representing that the software update will start when the IG power supply is turned off.

It is to be noted that regarding the update information 300, the notification control unit 220 does not perform control to change a display time according to whether the passenger in the vehicle 20 has seen the update information in the past.

FIG. 5 shows an example of update information 400 that is caused to be displayed by the IVI 299. The update information 400 is information that is notified when it is determined that the software update is not to be performed when turning off the IG power supply. When the passenger performs an operation of turning off the IG power supply and when it is determined that the vehicle 20 is not in a state where the software update of the ECU 205 can be executed, the notification control unit 220 causes the IVI 299 to display the update information 400. The update information 400 includes information 401 representing that the system of the vehicle 20 is to be ended without performing the software update and information 402 representing that the system update will be attempted next time the IG power supply is turned off. When the update information 400 is displayed, the notification control unit 220 performs control to change the display time according to whether the passenger in the vehicle 20 has seen the update information in the past.

Figure 6:
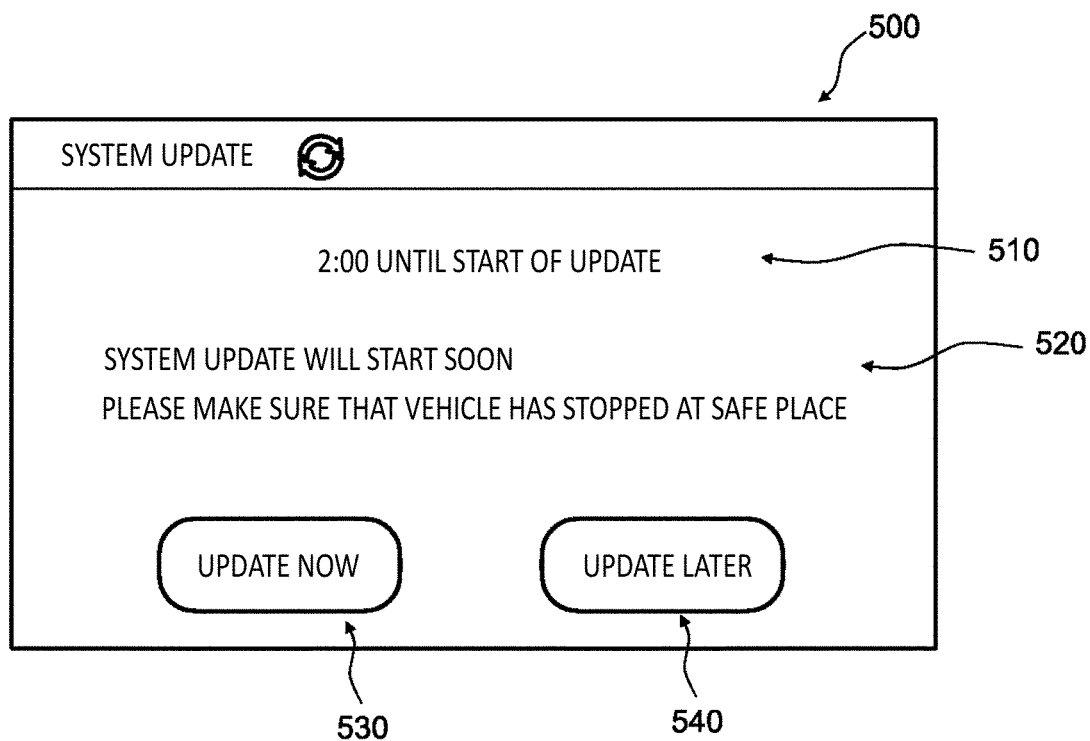
FIG. 6 shows an example of update information 500 that is caused to be displayed by the IVI 299.

FIG. 6 shows an example of update information 500 that is caused to be displayed by the IVI 299. The update information 500 is information that is notified when it is determined that the activation of the update software is to be performed when the IG power supply is turned off. The update information 500 is update information related to the "execution of activation". When the passenger performs an operation of turning off the IG power supply and when it is determined that the vehicle 20 is in a state where the activation of the update software of the ECU 205 can be executed, the notification control unit 220 causes the IVI 299 to display the update information 500.

The update information 500 includes wait time information 510 which is a time until the update of the ECU 204 is started, message information 520 to the passenger, a UI button 530 for acquiring, from the passenger, an update execution instruction that instructs to execute the update, and a UI button 540 for acquiring, from the passenger, an update postponement instruction that instructs not to execute the update.

The wait time information 510 includes information representing a remaining time until the update control unit 240 automatically starts the update of the ECU 204. The notification control unit 220 counts down the remaining time of the wait time information 510 as the time elapses. The message information 520 is information for notifying the user of the start of the system update and that the vehicle 20 should be stopped at a safe place.

The update control unit 240 acquires an operation made at a position of the UI button 530 as the update execution instruction from the passenger. When the update execution instruction is acquired, the update control unit 240 starts activating the ECU 205. The update control unit 240 acquires an operation made at a display position of the UI button 540 as the update postponement instruction from the passenger. When the update postponement instruction is acquired, the update control unit 240 ends the IG power supply without activating the ECU 205.

It is to be noted that regarding the update information 500, the notification control unit 220 does not perform control to change the display time according to whether the passenger in the vehicle 20 has seen the update information in the past.

FIG. 7 shows, in a table format, a data structure of history information used by the notification control unit 220 to change the display time of the update information. The history information is information for managing the number of times the passenger of the vehicle 20 has been notified of the update information in the past. In the history information, a person ID, a notification type ID, and the number of times of notification are associated with one another.

The person ID of the history information is information for identifying a person. The person ID may be information allocated by the image capturing apparatus 297 to each person recognized by the image capturing apparatus 297, for example.

The notification type ID of the history information is information for identifying a type of update information. The notification type ID is information for identifying update information to be a target for the notification control unit 220 to adjust the display time. For example, the notification type ID includes information for identifying the update information 400 shown in FIG. 4.

The number of times of notification of the history information represents the number of times the notification control unit 220 has notified a person identified by the person ID of the update information identified by the notification type ID.

Figure 8:
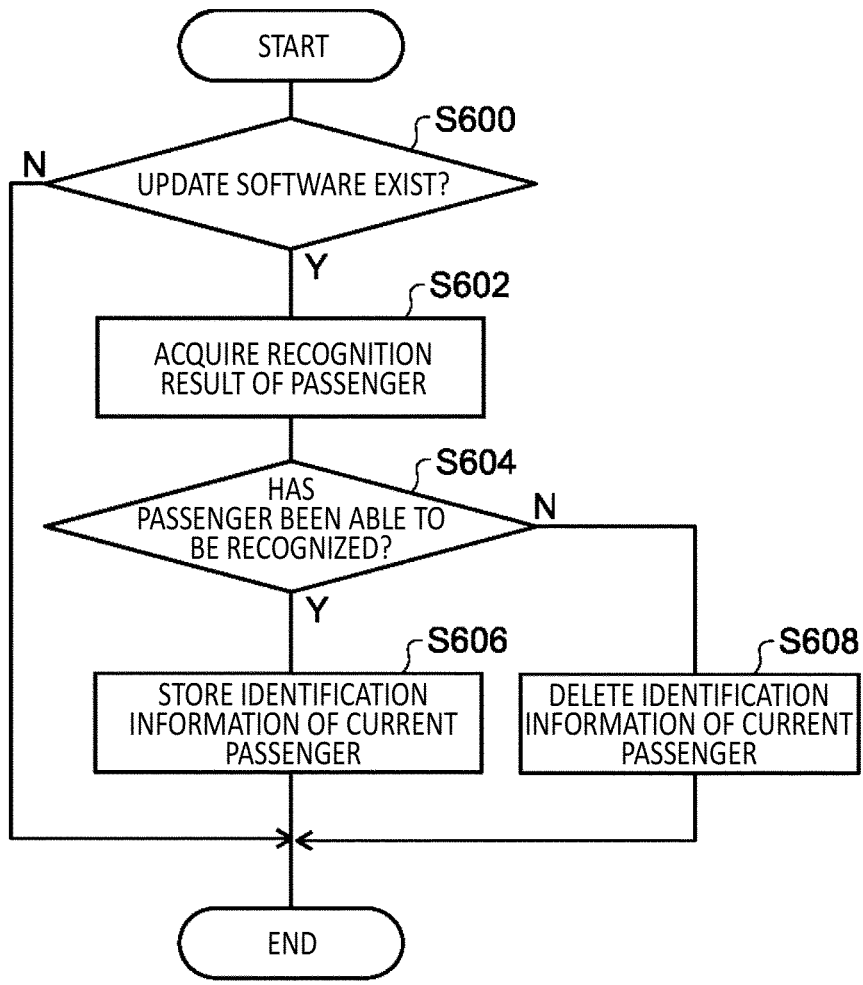
FIG. 8 is a flowchart showing a processing procedure for updating identification information of a current passenger in a vehicle 20.

FIG. 8 is a flowchart showing a processing procedure for updating identification information of a current passenger in the vehicle 20. The processing shown in FIG. 8 is executed periodically in the ECU 202. The processing shown in FIG. 8 is executed even while the vehicle 20 is traveling.

In S600, the notification control unit 220 determines whether update software of the ECU 205 exists. For example, when update software of the ECU 205 downloaded from the server 70 is transferred to the ECU 205, the notification control unit 220 determines that the update software of the ECU 205 exists. For example, the notification control unit 220 may determine that the update software of the ECU 205 exists at the time t3 in FIG. 3. It is to be noted that the notification control unit 220 may determine that the update software of the ECU 205 exists when the update software of the ECU 205 is downloaded from the server 70. For example, the notification control unit 220 may determine that the update software of the ECU 205 exists at the time t2 in FIG. 3. The notification control unit 220 may determine that the update software of the ECU 205 exists when a notification notifying that the update software of the ECU 205 exists is received from the server 70 before the update software of the ECU 205 is downloaded from the server 70.

In S602, the acquisition unit 210 requests the image capturing apparatus 297 of a recognition result of the passenger, and thus acquires the recognition result of the passenger recognized by the image capturing apparatus 297 from an image obtained by image-capturing the inside of the vehicle 20, that has been captured by the image capturing apparatus 297. For example, when the passenger has been able to be recognized from the image obtained by image-capturing the inside of the vehicle 20, the image capturing apparatus 297 transmits a recognition result including a person ID of the recognized passenger to the ECU 202. When the passenger has been unable to be recognized from the image obtained by image-capturing the inside of the vehicle 20, the image capturing apparatus 297 transmits a recognition result representing that the passenger has been unable to be recognized to the ECU 202. The acquisition unit 210 acquires the recognition result transmitted from the image capturing apparatus 297 to the ECU 202 as the recognition result of the current passenger.

In S604, the notification control unit 220 determines whether the passenger of the vehicle 20 has been able to be recognized. For example, the notification control unit 220 determines that the passenger of the vehicle 20 has been able to be recognized when the recognition result acquired by the acquisition unit 210 includes a person ID. When determining that the passenger of the vehicle 20 has been able to be recognized, in S606, the notification control unit 220 stores the person ID included in the recognition result acquired in S602 as identification information of the current passenger in the vehicle 20, and ends the processing. When determining that the passenger of the vehicle 20 has been unable to be recognized, the notification control unit 220 deletes the stored identification information of the passenger in S608, and ends the processing.

Figure 9:
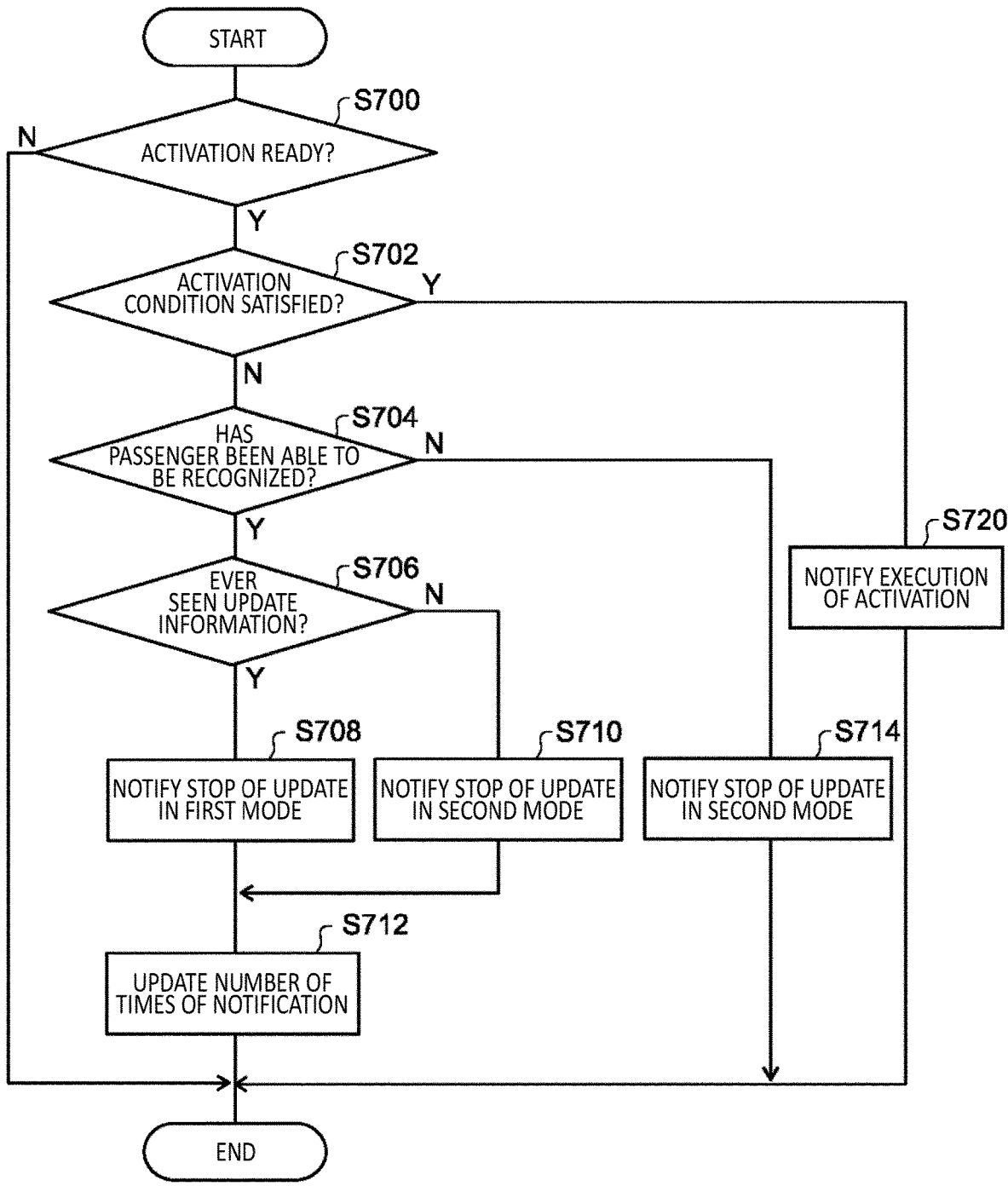
FIG. 9 is a flowchart showing a processing procedure related to update information notification control.

FIG. 9 is a flowchart showing a processing procedure related to the update information notification control. The processing shown in FIG. 9 is started when an operation of turning off the IG power supply is detected.

In S700, the notification control unit 220 determines whether the preparation for performing activation of the ECU 205 is completed. For example, the notification control unit 220 determines that the preparation for performing activation of the ECU 205 is completed when writing of update software to the ECU 205 is completed. When the preparation for performing activation is not completed, the processing ends.

When the preparation for performing activation is completed, the notification control unit 220 determines whether a predetermined condition for executing the activation is satisfied in S702. For example, when the vehicle 20 is stopped and the charging state of the battery provided in the vehicle 20 is higher than a predetermined value requisite for performing the software update of the ECU 205, the notification control unit 220 determines that the predetermined condition for executing the activation is satisfied.

When the predetermined condition for executing the activation is not satisfied, the notification control unit 220 determines whether the passenger has been able to be recognized in S704. For example, the notification control unit 220 determines that the passenger has been able to be recognized when the identification information of the current passenger is stored.

When the passenger has been able to be recognized, the notification control unit 220 determines whether the current passenger in the vehicle 20 has seen the update information 400 in the past in S706. For example, the notification control unit 220 references the history information to determine whether the current passenger in the vehicle 20 has seen the update information 400 in the past. Specifically, the notification control unit 220 acquires the number of times of notification associated with the identification information of the current passenger and the notification type of the update information 400 from the history information, and determines that the current passenger in the vehicle 20 has seen the update information 400 in the past when the acquired number of times of notification exceeds a predetermined number of times. The predetermined number of times may be a value of 0 or more. The predetermined number of times may be a value of 1 or more.

When the current passenger in the vehicle 20 has seen the update information in the past, the notification control unit 220 performs the notification of the update information 400 in a first mode in S708. The notification control unit 220 causes the IVI 299 to display the update information 400. The first mode is a display mode in which the update information is displayed for a first display time. Upon completing the notification of the update information in S708, the notification control unit 220 updates the number of times of notification in the history information in S712, and ends the processing.

It is to be noted that while the update information 400 is displayed in S708, the acquisition unit 210 may acquire line of sight information representing a line of sight direction of the passenger in the vehicle 20 from the image capturing apparatus 297, and the notification control unit 220 may determine, based on the line of sight information acquired from the image capturing apparatus 297, whether the passenger in the vehicle 20 is looking at the display screen of the IVI 299. When determining that the passenger in the vehicle 20 is looking at the display screen on which the notification of the update information is displayed, the notification control unit 220 may prolong a display time of the notification of the update information 400.

Further, while the update information 400 is displayed in S708, the acquisition unit 210 acquires, from the IVI 299, operation information representing whether the display screen on which the notification of the update information is displayed has been operated. The notification control unit 220 may determine, based on the operation information, whether the display screen of the IVI 299 has been operated, and prolong the display time of the notification of the update information 400 when determining that the display screen of the IVI 299 has been operated.

When determining in S706 that the current passenger in the vehicle 20 has not seen the update information in the past, the notification control unit 220 performs a notification of the update information 400 in a second mode in S710. The second mode is a display mode in which the update information is displayed for a second display time. The second display time is shorter than the first display time. Upon completing the notification of the update information in S710, the notification control unit 220 updates the number of times of notification in the history information in S712. Specifically, the notification control unit 220 updates the number of times of notification associated with the identification information of the current passenger and the notification type of the update information 400. Upon completing the processing of S712, the processing ends.

When determining in S704 that the passenger has been unable to be recognized, the notification control unit 220 performs the notification of the update information 400 in the second mode in S714, and ends the processing.

When determining in S702 that the predetermined condition for executing activation is not satisfied, the notification control unit 220 performs a notification of the update information 500 in S720, and ends the processing. The notification control unit 220 notifies the update information 500 in a specific notification mode irrespective of whether the passenger has seen the update information. That is, regarding the update information 500, the notification control unit 220 does not perform control to change the notification mode according to whether the passenger has seen the update information 500.

It is to be noted that according to the examples shown in FIGS. 8 and 9, when an operation of turning off the IG power supply is detected, the notification control unit 220 determines whether to perform control to change the notification mode of the update information 400, based on identification information of the passenger of the vehicle 20, who has been recognized at a latest timing before the operation of turning off the IG power supply is detected. Alternatively, a form may be adopted in which, when the operation of turning off the IG power supply is detected, the processing of S602 in FIG. 8 is performed between S702 and S704 in FIG. 9.

As described above, according to the control system 200 of the present embodiment, the passenger in the vehicle 20 is recognized by an image recognition, and a display time of update information is shortened when determined that the recognized passenger has seen the update information in the past. Accordingly, the display of update information can be optimized according to whether the passenger in the vehicle 20 has received the notification of update information. Therefore, a passenger who has not seen the update information in the past is enabled to sufficiently understand the notification content. On the other hand, it is possible to enable a passenger who has seen the update information in the past to not feel bothersome. Moreover, by shortening the display time of the update information, a time required for shutting down the power supply system of the vehicle 20 can be shortened. Accordingly, power consumption of the vehicle 20 can be reduced.

It is to be noted that a method of changing a display color of update information can also be adopted as another method of changing the mode of the notification of update information. A method of changing brightness in display of update information can also be adopted as another method of changing the mode of the notification of update information. Other than the display, a mode of notifying by voice can be adopted as the mode of the notification of update information. In this case, as the method of changing the mode of the notification of update information, a method of changing a time during which voice related to update information is output and/or a method of changing a sound volume of the voice related to update information can be adopted. In addition to the change of the display time of update information, the notification control unit 220 may apply any combination selected from the change of a display color of update information, the change of brightness in display of update information, the change of a time during which voice related to update information is output, and the change of a sound volume of voice related to update information.

It is to be noted that the vehicle 20 is a vehicle as an example of transportation equipment. The vehicle may be an automobile such as an automobile including an internal combustion engine, an electric vehicle, and a fuel cell vehicle (FCV). The automobile includes a bus, a truck, a two-wheeled vehicle, and the like. The vehicle may be a saddle type vehicle or the like, and may be a motorcycle. The transportation equipment includes, in addition to the vehicle, equipment such as an aircraft including an unmanned aerial vehicle, and a ship. The transportation equipment may be any equipment for transporting people or items. The transportation equipment is an example of a movable object. The movable object is not limited to the transportation equipment and may be any movable equipment.

Figure 10:
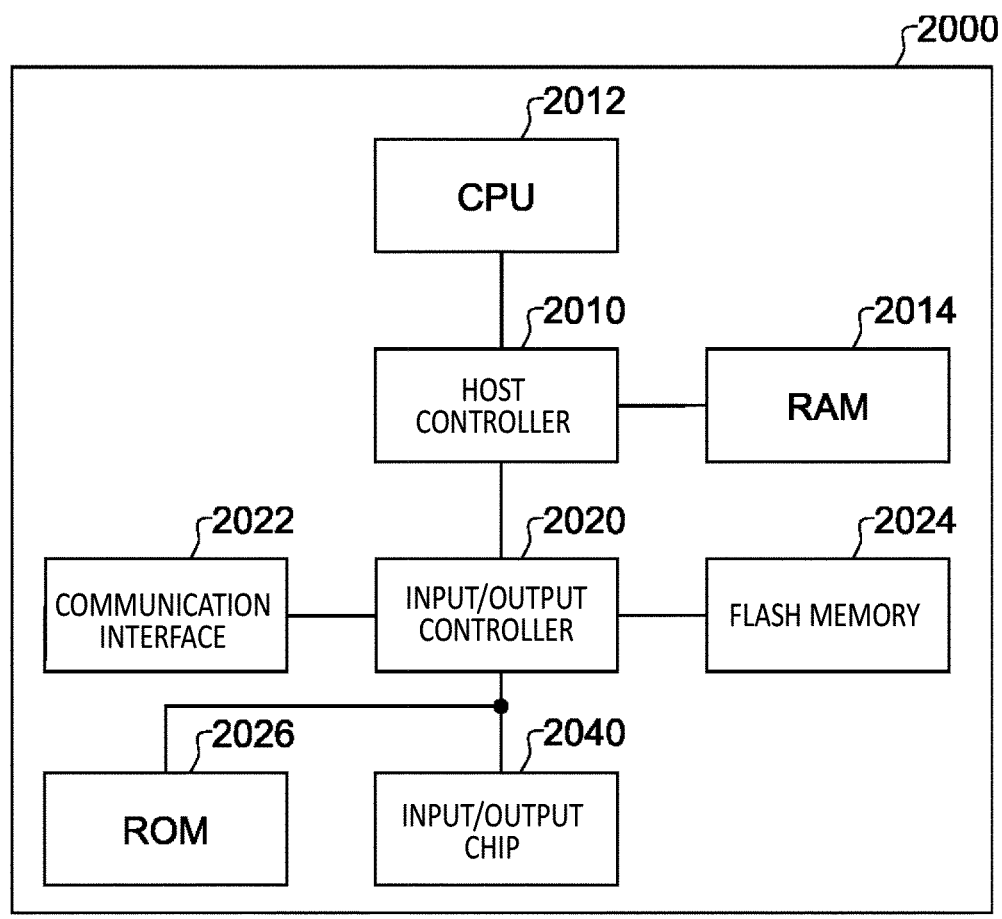
FIG. 10 shows an example of a computer 2000 in which a plurality of embodiments of the present invention may be entirely or partially embodied.

FIG. 10 shows an example of a computer 2000 in which a plurality of embodiments of the present invention may be entirely or partially embodied. Programs installed in the computer 2000 can cause the computer 2000 to function as the system such as the control system according to the embodiment, each unit of the system, the apparatus such as the ECU 202, or each unit of the apparatus, or can cause the computer 2000 to execute operations associated with the system, each unit of the system, the apparatus, or each unit of the apparatus, and/or can cause the computer 2000 to execute a process according to the embodiment or steps of the process. Such programs may be executed by a CPU 2012 to cause the computer 2000 to execute certain operations associated with the processing procedures described in the present specification and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and an HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026 and executed by the CPU 2012. The information processing described in these programs is read into the computer 2000, resulting in cooperation between a program and the above-described various types of hardware resources. An apparatus or method may be constituted by realizing the operation or processing of information according to a use of the computer 2000.

For example, when communication is executed between the computer 2000 and an external device, the CPU 2012 may execute a communication program loaded onto the RAM 2014 to instruct the communication interface 2022 to carry out communication processing based on the processing written in the communication program. The communication interface 2022, under control of the CPU 2012, reads transmission data stored in a transmission buffer processing region provided in recording medium such as the RAM 2014 and the flash memory 2024, and transmits the read transmission data to a network and writes reception data received from a network in a reception buffer processing region or the like provided on the recording medium.

In addition, the CPU 2012 may cause all or a necessary portion of a file or a database to be read into the RAM 2014, the file or the database having been stored in a recording medium such as the flash memory 2024, and execute various types of processing on the data on the RAM 2014. The CPU 2012 may then write back the processed data to the recording medium.

Various types of information such as various types of programs, data, tables, and databases may be stored in the recording medium to undergo information processing. The CPU 2012 may execute various types of processing on the data read from the RAM 2014, which includes various types of operations, information processing, conditional judging, conditional branch, unconditional branch, search/replacement of information, and the like, as described herein and designated by an instruction sequence of programs, and writes the result back to the RAM 2014. In addition, the CPU 2012 may search for information in a file, a database, and the like in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The program or software module described above may be stored in a computer-readable storage medium on the computer 2000 or near the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program, which is installed on the computer 2000 and causes the computer 2000 to function as the ECU 202, may work on the CPU 2012 or the like to cause the computer 2000 to function as each unit of the ECU 202. The information processing described in these programs is read into the computer 2000, thereby functioning as each unit of the ECU 202 as specific means in which software and the various hardware resources described above cooperate with one another. Then, by the specific means realizing calculation or processing of information according to a purpose of use of the computer 2000 in the present embodiment, a unique ECU 202 according to the purpose of use is constructed.

Various embodiments have been described with reference to the block diagrams and the like. In the block diagrams, each block may represent (1) a step of a process in which an operation is executed, or (2) each unit of the apparatus having a role of executing the operation. Certain steps and each unit may be implemented by dedicated circuitry, programmable circuitry supplied with computer-readable instructions stored on the computer-readable storage media, and/or processors supplied with computer-readable instructions stored on computer-readable storage media. Dedicated circuitry may include digital and/or analog hardware circuits, or may include integrated circuits (IC) and/or discrete circuits. Programmable circuitry may include reconfigurable hardware circuits including logical AND, logical OR, logical XOR, logical NAND, logical NOR, and other logical operations, flip-flops, registers, memory elements such as a field-programmable gate array (FPGA) and a programmable logic array (PLA), and the like.

Computer-readable storage media may include any tangible device that can store instructions for execution by a suitable device, such that the computer-readable storage medium having instructions stored therein forms at least a portion of an article of manufacture including instructions which can be executed to create means for executing processing procedures or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disc read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, special purpose computer, or other programmable data processing apparatus, or to programmable circuitry, locally or via a local area network (LAN), a wide area network (WAN) such as the Internet, or the like, to execute the computer-readable instructions to provide means for executing the processing procedures described above or operations specified in the block diagrams. Examples of the processor include a computer processor, a processing unit, a microprocessor, a digital signal processor, a controller, a microcontroller, and the like.

While the present invention have been described with the embodiments, the technical scope of the present invention is not limited to the above described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: update system;
20: vehicle;
70: server;
90: communication network;
200: control system;
201: TCU;
202: ECU;
204: ECU;
205: ECU;
209: communication unit;
210: acquisition unit;
211: antenna;
220: notification control unit;
240: update control unit;
280: in-vehicle communication network;
291: FI;
292: battery;
297: image capturing apparatus;
298: MID;
299: IVI;
300: update information;
301: information;
302: information;
400: update information;
401: information;
402: information;
500: update information;
510: wait time information;
520: message information;
530: UI button;
540: UI button;
2000: computer;
2010: host controller;
2012: CPU;
2014: RAM;
2020: input/output controller;
2022: communication interface;
2024: flash memory;
2026: ROM;
2040: input/output chip.

What is claimed is:

1. A software update control apparatus which is mounted on a vehicle and is configured to control a software update of in-vehicle equipment performed via a communication unit, comprising:
an acquisition unit configured to acquire information representing a recognition result of a passenger in the vehicle, who has been recognized by capturing an image of the passenger in the vehicle; and
a notification control unit configured to control a notification of update information related to the software update,
wherein the notification control unit is configured to determine, based on the information representing the recognition result of the passenger in the vehicle, whether the passenger in the vehicle has received the notification of the update information in a past, and change a mode of the notification of the update information according to a determination result on whether the passenger in the vehicle has received the notification of the update information in the past; and
the notification control unit is configured to, when determining that the passenger in the vehicle has received the notification of the update information in the past, set a display time of the notification of the update information to be shorter than the display time when determining that the passenger in the vehicle has not received the notification of the update information in the past.

2. The software update control apparatus according to claim 1, wherein
the notification control unit is configured to, when a power supply of the vehicle is turned off, determine, based on the information representing the recognition result of the passenger in the vehicle, who has been recognized at a latest timing before the power supply of the vehicle is turned off, whether the passenger in the vehicle has received the notification of the update information in the past.

3. The software update control apparatus according to claim 2, wherein
the acquisition unit is configured to further acquire line of sight information representing a line of sight direction of the passenger in the vehicle, which has been identified by capturing the image of the passenger in the vehicle, and
the notification control unit is configured to determine, based on the line of sight information, whether the passenger in the vehicle is looking at a display screen on which the notification of the update information is displayed, and prolong the display time of the notification of the update information when determining that the passenger in the vehicle is looking at the display screen on which the notification of the update information is displayed.

4. The software update control apparatus according to claim 3, wherein
the acquisition unit is configured to further acquire operation information representing whether a display screen on which the notification of the update information is displayed has been operated, and
the notification control unit is configured to determine, based on the operation information, whether the display screen has been operated, and prolong the display time of the notification of the update information when determining that the display screen has been operated.

5. The software update control apparatus according to claim 2, wherein the update information is information notified when a predetermined condition for starting the software update is not satisfied in a case where the power supply of the vehicle is turned off, and
the notification control unit is configured to determine whether the predetermined condition is satisfied when the power supply of the vehicle is turned off, determine, when the predetermined condition is not satisfied, whether the passenger in the vehicle has received the notification of the update information in the past, and change the mode of the notification of the update information according to the determination result on whether the passenger in the vehicle has received the notification of the update information in the past.

6. The software update control apparatus according to claim 2, wherein
the notification control unit is configured to determine, while the vehicle is traveling, whether the software update is to be performed, and
the acquisition unit is configured to start acquiring, when it is determined that the software update is to be performed, the information representing the recognition result of the passenger in the vehicle.

7. The software update control apparatus according to claim 1, wherein
the acquisition unit is configured to further acquire line of sight information representing a line of sight direction of the passenger in the vehicle, which has been identified by capturing the image of the passenger in the vehicle, and
the notification control unit is configured to determine, based on the line of sight information, whether the passenger in the vehicle is looking at a display screen on which the notification of the update information is displayed, and prolong the display time of the notification of the update information when determining that the passenger in the vehicle is looking at the display screen on which the notification of the update information is displayed.

8. The software update control apparatus according to claim 7, wherein
the update information is information notified when a predetermined condition for starting the software update is not satisfied in a case where a power supply of the vehicle is turned off, and
the notification control unit is configured to determine whether the predetermined condition is satisfied when the power supply of the vehicle is turned off, determine, when the predetermined condition is not satisfied, whether the passenger in the vehicle has received the notification of the update information in the past, and change the mode of the notification of the update information according to the determination result on whether the passenger in the vehicle has received the notification of the update information in the past.

9. The software update control apparatus according to claim 1, wherein
the acquisition unit is configured to further acquire operation information representing whether a display screen on which the notification of the update information is displayed has been operated, and
the notification control unit is configured to determine, based on the operation information, whether the display screen has been operated, and prolong the display time of the notification of the update information when determining that the display screen has been operated.

10. The software update control apparatus according to claim 1, wherein
the update information is information notified when a predetermined condition for starting the software update is not satisfied in a case where a power supply of the vehicle is turned off, and
the notification control unit is configured to determine whether the predetermined condition is satisfied when the power supply of the vehicle is turned off, determine, when the predetermined condition is not satisfied, whether the passenger in the vehicle has received the notification of the update information in the past, and change the mode of the notification of the update information according to the determination result on whether the passenger in the vehicle has received the notification of the update information in the past.

11. The software update control apparatus according to claim 1, wherein
the notification control unit is configured to determine, while the vehicle is traveling, whether the software update is to be performed, and
the acquisition unit is configured to start acquiring, when it is determined that the software update is to be performed, the information representing the recognition result of the passenger in the vehicle.

12. The software update control apparatus according to claim 1, wherein
the information representing the recognition result of the passenger in the vehicle further includes information representing whether the passenger in the vehicle is a driver, and
the notification control unit is configured to determine, based on the information representing the recognition result of the passenger in the vehicle, whether the driver in the vehicle has received the notification of the update information in the past, and change the mode of the notification of the update information according to a determination result on whether the driver in the vehicle has received the notification of the update information in the past.

13. A vehicle, comprising:
the software update control apparatus according to claim 1.

14. A non-transitory computer-readable storage medium having stored thereon a program that causes a computer to function as a software update control apparatus which is mounted on a vehicle and is configured to control a software update of in-vehicle equipment performed via a communication unit, the program causing the computer to function as:
an acquisition unit configured to acquire information representing a recognition result of a passenger in the vehicle, who has been recognized by capturing an image of the passenger in the vehicle; and
a notification control unit configured to control a notification of update information related to the software update, wherein the notification control unit is configured to determine, based on the information representing the recognition result of the passenger in the vehicle, whether the passenger in the vehicle has received the notification of the update information in a past, and change a mode of the notification of the update information according to a determination result on whether the passenger in the vehicle has received the notification of the update information in the past; and the notification control unit is configured to, when determining that the passenger in the vehicle has received the notification of the update information in the past, set a display time of the notification of the update information to be shorter than the display time when determining that the passenger in the vehicle has not received the notification of the update information in the past.

15. A software update control method for controlling a software update of in-vehicle equipment performed via a communication unit, comprising:
    acquiring information representing a recognition result of a passenger in a vehicle, who has been recognized by capturing an image of the passenger in the vehicle; and
    controlling a notification of update information related to the software update,
    wherein the controlling a notification of update information related to the software update includes:
        determining, based on the information representing the recognition result of the passenger in the vehicle, whether the passenger in the vehicle has received the notification of the update information in a past;
        changing a mode of the notification of the update information according to a determination result on whether the passenger in the vehicle has received the notification of the update information in the past; and
        when determining that the passenger in the vehicle has received the notification of the update information in the past, setting a display time of the notification of the update information to be shorter than the display time when determining that the passenger in the vehicle has not received the notification of the update information in the past.

* * * * *